Inventors
George A. Montooth.
William J. Schlitt, Jr.
By
Attorney.

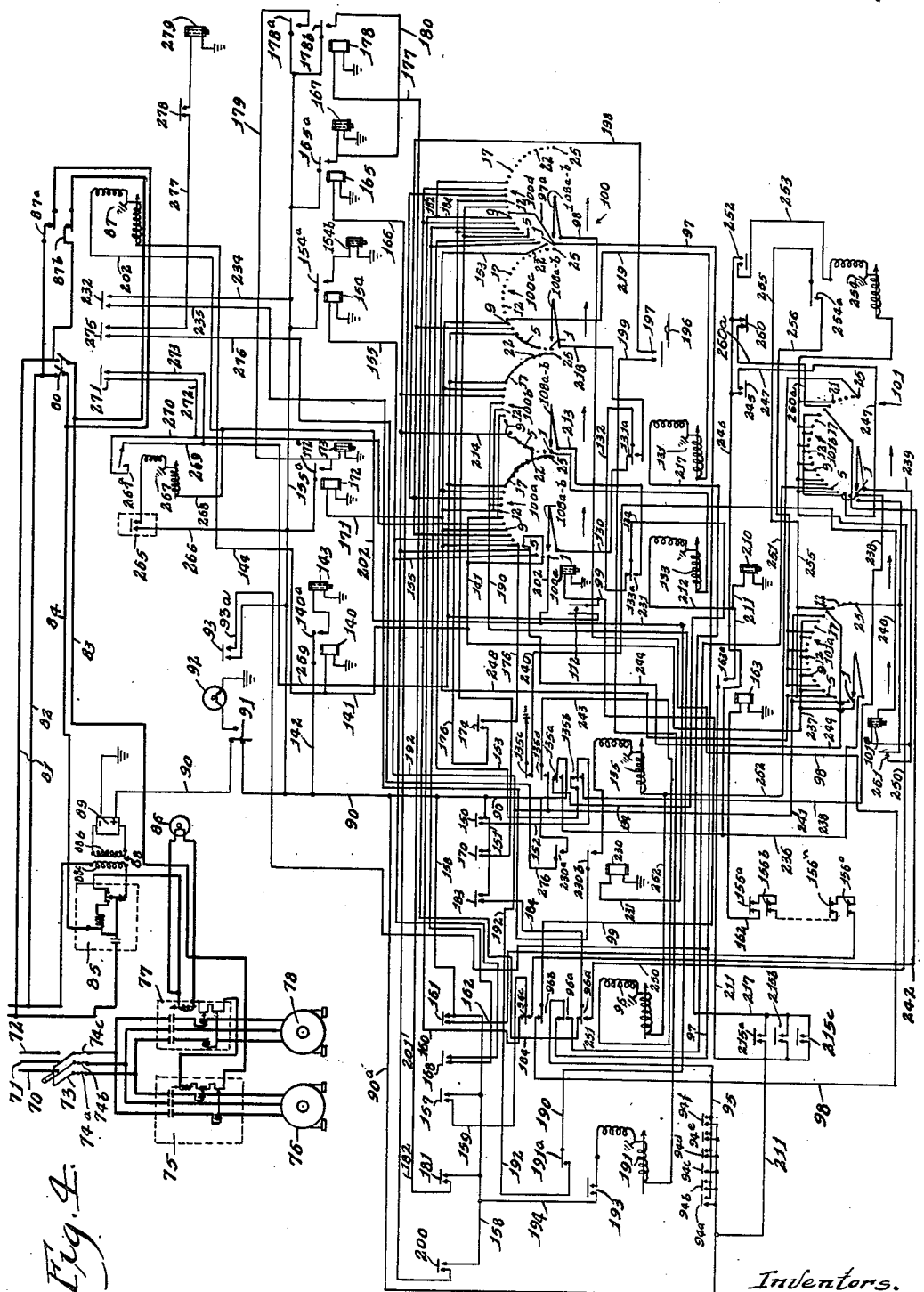

March 29, 1955   G. A. MONTOOTH ET AL   2,705,146
CONTROL CIRCUIT FOR A PIN SETTING MACHINE
Filed March 11, 1948   6 Sheets-Sheet 5
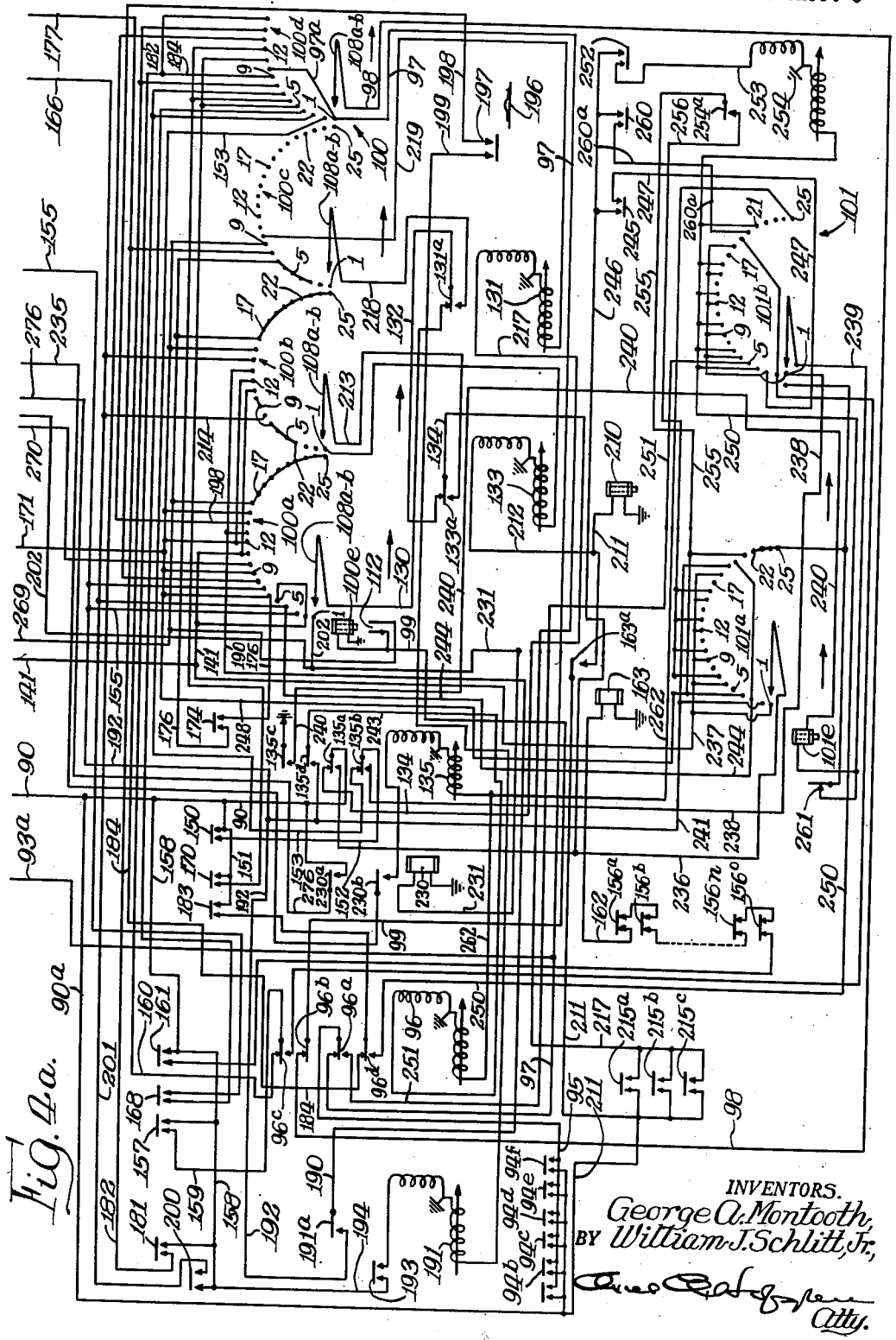
INVENTORS.
George A. Montooth,
BY William J. Schlitt, Jr.,
Atty.

March 29, 1955
G. A. MONTOOTH ET AL
2,705,146
CONTROL CIRCUIT FOR A PIN SETTING MACHINE
Filed March 11, 1948
6 Sheets-Sheet 6
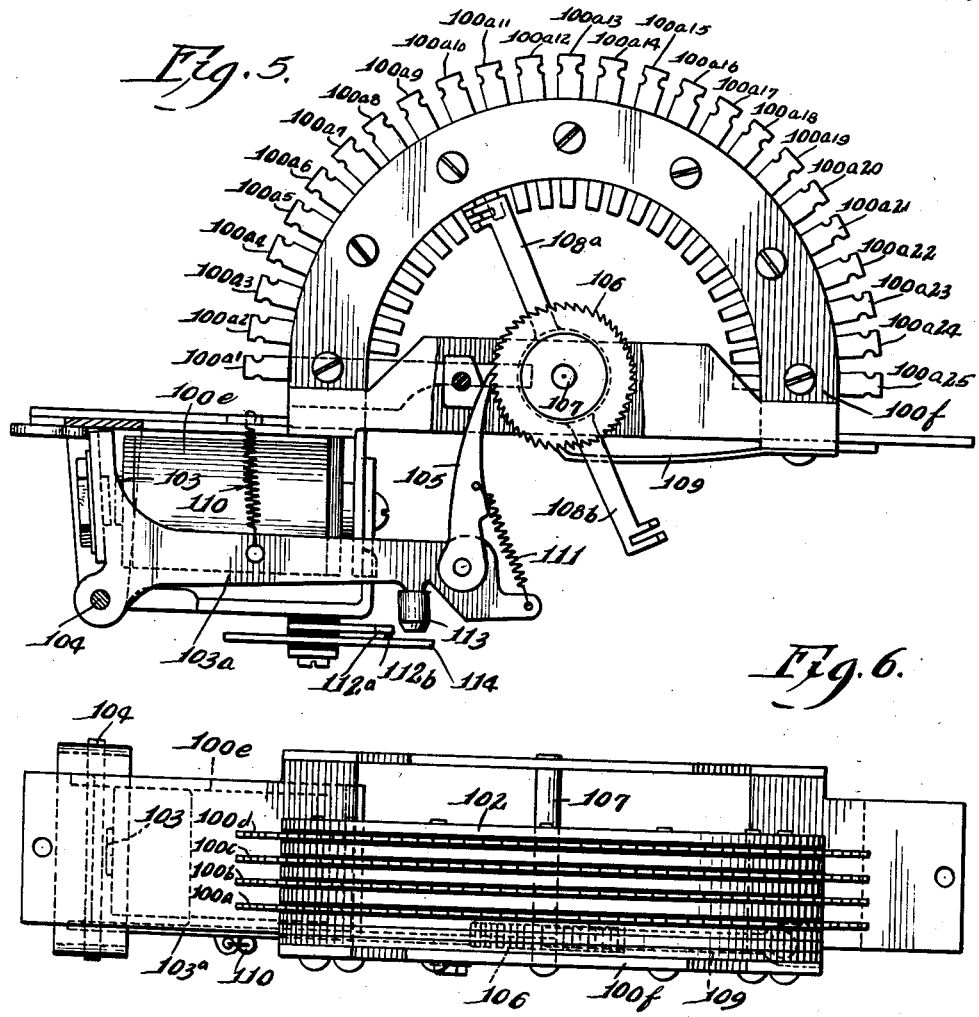
Inventors.
George A. Montooth.
William J. Schlitt Jr.
By Orval Bell Japer
Attorney.

United States Patent Office 2,705,146
Patented Mar. 29, 1955

2,705,146

CONTROL CIRCUIT FOR A PIN SETTING MACHINE

George A. Montooth, Long Beach, Calif., and William J. Schlitt, Jr., Columbus, Ohio, assignors to The Brunswick-Balke-Collender Company, Chicago, Ill., a corporation of Delaware Application March 11, 1948, Serial No. 14,358

21 Claims. (Cl. 273—43)

This invention relates to a control circuit for a pinsetting machine, and more particularly to a control circuit for providing complete automatic operation of a pinsetting machine.

One object of this invention is to provide an improved control circuit for a pinsetting machine.

In pinsetting machines of the type herein disclosed the operating cycle is designed for permitting two balls to be rolled during each bowler's turn. This assumes that the bowler is more likely to roll two balls and score a "spare" or a "miss" than he is to roll one ball and obtain a "strike". The terms "two ball cycle" and "spare cycle" are used herein to denote a cycle of operation wherein the machine, after a bowler rolls a first ball, temporarily lifts or otherwise handles the standing pins while the fallen pins are removed, and then returns the standing pins to or leaves them at their positions for the rolling of a second ball. After the second ball is rolled, a full set of pins is set regardless of whether any pins remained standing after the second ball or not. If the bowler knocks down all ten pins with the first ball and thereby obtains a "strike," the machine automatically operates on a oneball or "strike" cycle and removes the fallen pins and sets a full set.

Another object of this invention is to provide a control circuit arranged normally to operate a pinsetting machine through a two ball cycle, but adapted to operate the machine through a one ball cycle in the event a strike is made on the first ball.

Occasionally the first ball rolled by a bowler will cause a pin to move a considerable distance from its original spot without knocking it down. Another object is to provide a control circuit arranged normally to operate a pinsetting machine through a two ball cycle, but arranged to change the operation of said machine in the event a bowling pin is moved off its normal pin spot to a position where it cannot be handled by the machine while fallen pins are removed.

Another object of this invention is to provide a control circuit arranged to operate a pinsetting machine through a practice cycle in which the machine operates automatically first to clear the alley of pins and then to return a predetermined number of rolled balls to the player's end of the alley while the bowler practices without pins on the alley, the machine resetting the pins on the alley after the predetermined number of practice balls have been rolled.

Bowling alley operators generally provide different sets of pins for different leagues and for non-league play, so it is frequently necessary to remove one entire complement of pins from a machine and insert another complement. Another object of this invention is to provide a novel control circuit for a pinsetting machine which has mechanism for storing a separate complement of pins and for changing to one complement or the other and which includes an arrangement for operating the pin changing mechanism when desired.

Other objects and advantages will be apparent from the following detailed description taken in connection with the accompanying drawings, in which:

Fig. 4 is a schematic diagram of the control circuit for the machine;

Fig. 4a is an enlarged schematic diagram of the lower portion of Fig. 4;

Fig. 5 is an elevation of one of the stepping switches used in the operation of the machine; and Fig. 6 is a top plan view of the stepping switch of Fig. 5.

Figure 1:
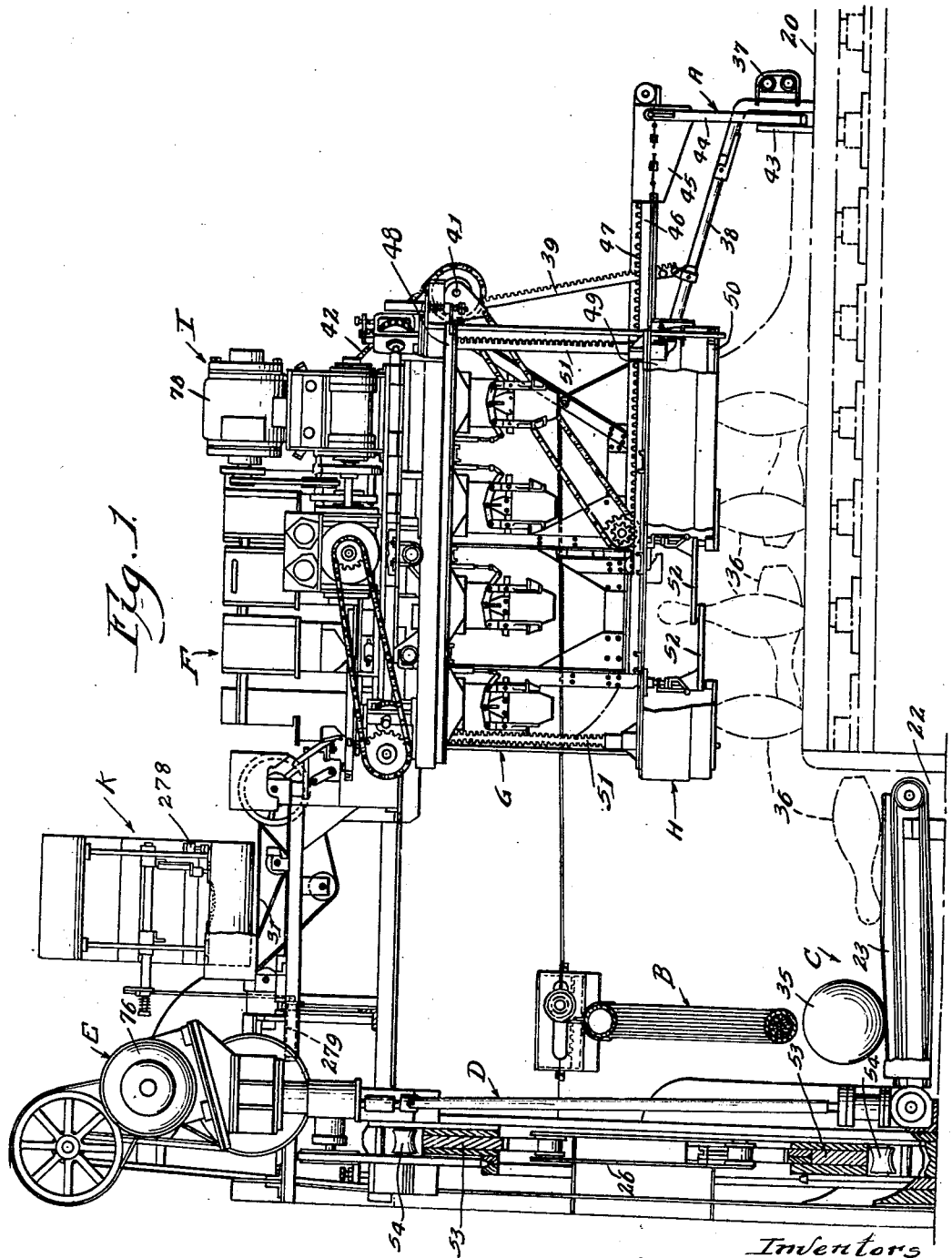
Fig. 1 is a side view, partly in section, of a machine constructed in accordance with the invention.

While the invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Figure 2:
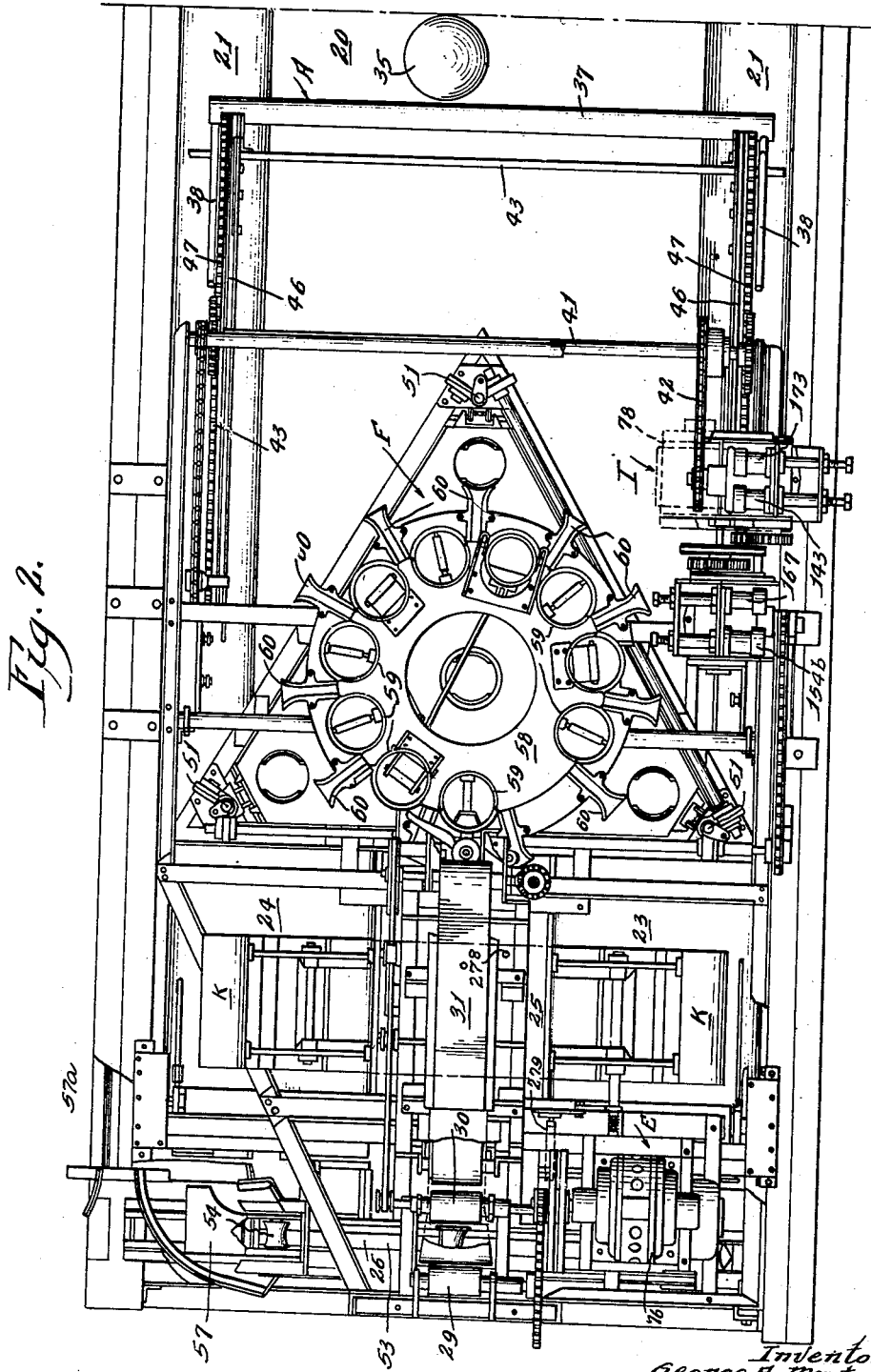
Fig. 2 is a top plan view of the machine of Fig. 1.

Referring now to the drawings, and particularly to Figs. 1 and 2, the machine illustrated is mounted for use on an alley bed 20 having conventional gutters 21 associated therewith and having at the rear thereof a conventional pit 22. Said machine comprises various ball and pin gathering mechanisms including a sweep and guard mechanism designated generally at A; a vertically movable swinging pit cushion designated generally at B; a continuously operating ball and pin conveyor system on the floor of the pit designated generally at C and comprising two side conveyors 23 and 24 running transversely of the alley and a center conveyor 25 running longitudinally of the alley toward the rear thereof, the conveyor system C being operative to move the balls and pins which have fallen from the alley bed into the pit to the rear of said pit cushion; and a ball and pin elevating system designated generally at D, this system being continuously operative and including means for moving the ball and pins to an elevated position behind the pit cushion, means for removing the ball to a ball return track, means for elevating the pins and arranging said pins in a desired manner, and means above the pit for conveying the pins across the pit to a position above the alley bed.

Means for driving the mechanisms C and D are designated generally at E, this means also serving to provide power for indexing a rotary pin arranging magazine F to which pins are fed by the pin gathering means above generally described. From the rotary magazine the pins are delivered to a pinsetting mechanism G which is positioned directly above the pin deck of the alley bed 20 and is operable to descend through a pin pickup mechanism H to set pins on said deck. Power to operate the sweep, pinsetting and pin pickup mechanisms is derived from a power arrangement I comprising a motor, a transmission assembly and other drive connections. The pickup mechanism H receives power from this drive arrangement to move vertically from its top position to a search and pin pickup position illustrated in Fig. 1. A pin changing mechanism designated generally at K is mounted on the machine, this mechanism receiving power from the drive means E and being operable to change the pins handled by the machine. The operation of the pin changing mechanism is fully described in the application of George A. Montooth filed March 11, 1948, as Serial No. 14,357. This application has matured into Patent No. 2,621,045 granted December 9, 1952.

Inasmuch as the operation of the ball and pin gathering mechanisms is described in the copending application of George A. Montooth filed January 14, 1948 as Serial No. 2,205, the complete operation of the machine will be described only briefly here to show the coordination between the operation of the machine and the operation of the control circuit for the machine.

When the machine is in its rest position before a ball has been rolled, the sweep and guard mechanism A is in its uper rest or inoperative position, the swinging pit cushion B which is connected to the sweep and guard mechanism and is operated concurrently with but in the opposite direction to the sweep and guard, is in its lower position where it extends transversely across the pit in the path of the ball 35, and the pin pickup mechanism H is in its upper or rest position.

A cycle of operation of the machine is initiated by rolling a ball 35 into the pit 22. While the cycle may be initiated in any one of a number of ways, as for example by placing one or more light beams in the path of the ball so that the interruption of the light beams by the ball causes actuation of a switch to start the cycle of operation, in the preferred embodiment of the machine illustrated the cycle of operation is initiated by the weight of the ball which closes one or more of a plurality of switches 94a–f which are positioned in the pit and are operated by the ball when on the conveyor system C. Momentary closure of one or more of these switches causes the sweep and guard A to be lowered to their operative position adjacent the alley bed, the guard protecting the machine mechanisms against damage from any balls which may inadvertently be rolled during the cycle of operation of the machine, and the sweep being in a position adjacent the alley bed so that it may move along the alley bed to sweep the alley clear of pins 36.

Figure 3:
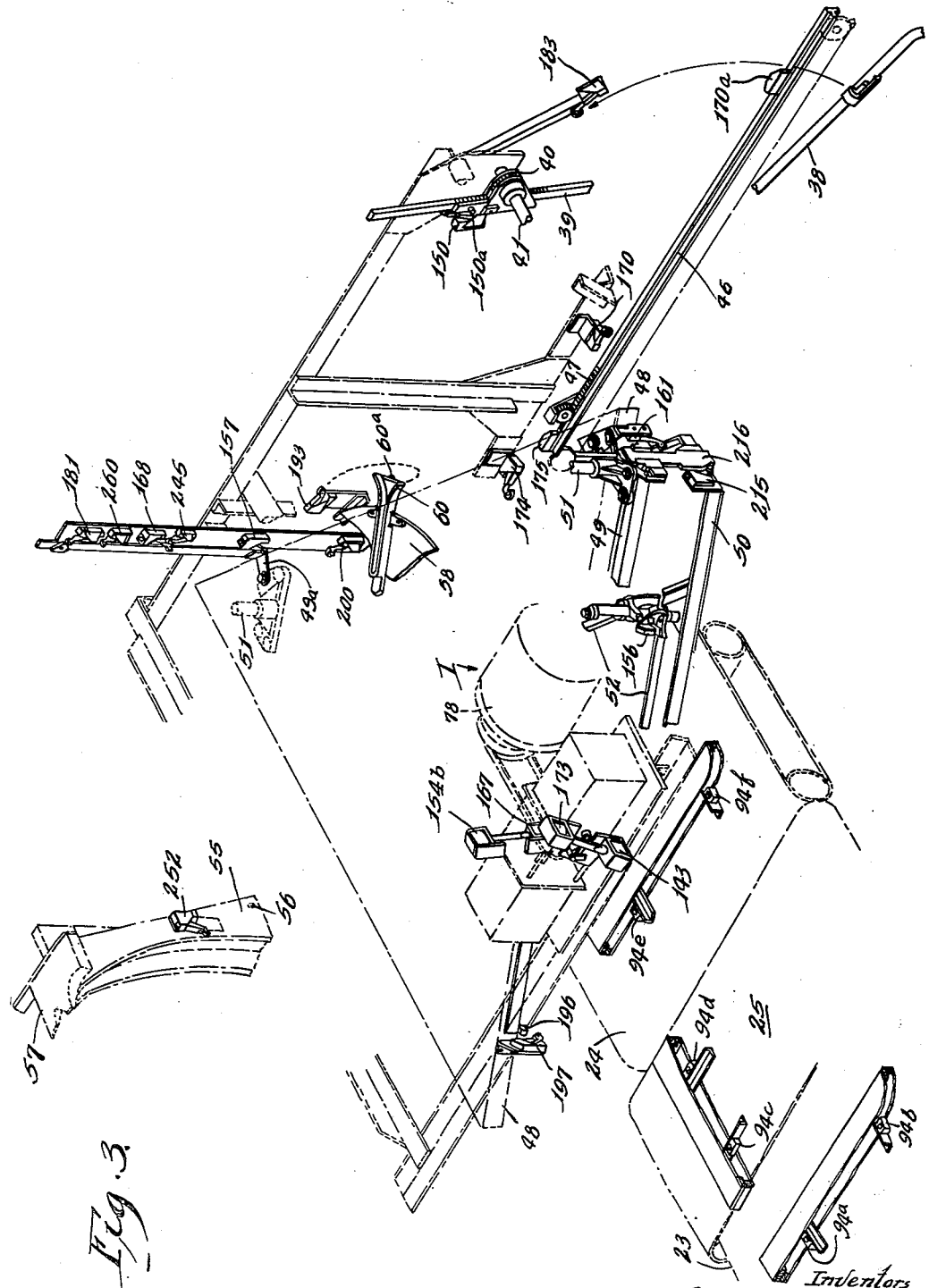
Fig. 3 is a fragmentary isometric view showing the switches and actuating mechanisms which control the operation of the machine shown in Figs. 1 and 2.

The guard comprises a member 37 which extends across the alley bed and which is carried by a pair of pivotally mounted arms 38, these arms being pivoted at their rear ends (left ends in Fig. 1) and being connected at a point intermediate their ends to a pair of racks 39 which engage pinions 40 (see Fig. 3). These pinions are mounted on a shaft 41 which is driven by the power arrangement I through a chain 42. The sweep comprises a member 43 which extends across the alley bed and is suspended on opposite sides of the alley on a pair of arms 44 which extend from brackets 45. The brackets 45 are movable along tracks 46 which have racks 47, and the entire sweep and guard assembly is carried by the racks 39 and is tiltable to an upper rest or inoperative position as described in detail in application Serial No. 2,205 above referred to.

Lowering of the sweep and guard assembly from its rest position to its lower operative position causes the swinging pit cushion B to be elevated to the position of Fig. 1 to permit passage of the ball 35 and pins 36 therebeneath. The pickup mechanism H then descends and searches for standing pins.

The pickup mechanism is in the form of a triangular frame comprising a plurality of grids 48, 49 and 50 (see Fig. 3) movable along vertically disposed racks 51, one rack being located at each corner of the frame as shown in Fig. 2. The grids 49 and 50 carry a plurality of switches adapted to be actuated by relative movement between the grids to change the operation of the machine in the event a pin is standing so far off its normal pin spot as to be struck by the lower grid 50. The lower grid 50 also carries a plurality (15 in the preferred embodiment of the machine) of pairs of pivotally mounted pickup arms 52, each pair of these arms carrying a normally closed switch 156 which is opened upon contact of the arms with a pin standing in a position to be grasped by said arms as they are closed. The switch 156 may be mounted on the movable support for one of the pickup arms 52 and is actuated by relative movement between the support and arm which occurs when a pin is grasped.

In the event one or more pins are left standing in a position to be handled by the machine, these pins are picked up and the alley bed is swept clear of dead wood, the pins which were not knocked over are replaced on the alley and the guard and sweep are raised to their inoperative position. Meanwhile the ball and the pins which were knocked into the pit by the ball or swept into the pit by the sweep are carried behind the pit cushion by the continuously operating conveyor system C, and at the rear of the pit the ball and pins are fed into a rotatable conveyor and sorter comprising a wheel 53 which rotates continuously about an axis extending longitudinally of said pit. Said wheel has about its periphery a plurality of recesses and a plurality of paddle members 54 for engaging the ball and pins. As the wheel rotates the ball is picked up in one of the recesses and the pins are picked up one-by-one by engagement with the paddle members 54 and are elevated above the pit. Means are provided for causing the ball to be removed from the wheel after a portion of a cycle of rotation of the wheel, and the pins are carried beyond this point to a position adjacent the top of the wheel where they are engaged between two vertically traveling belts 29 and 30 which pick the pins from the wheel and elevate them to a further point above the pit where they are delivered to a transverse or horizontal crossover conveyor 31. This conveyor carries the pins forwardly across the pit to a position above the alley bed and deposits them in the rotary magazine F. When the magazine F is loaded with a full complement of ten pins and when the pinsetting mechanism G is empty of pins and is in its upper position ready to receive pins, the pins are delivered from the magazine F to the pinsetting mechanism G so that after completion of a bowling frame the pinsetting mechanism may be lowered down through the pickup structure H to set a new group of pins on the alley bed.

As more fully described in the application Serial No. 2,205 above referred to, the means for removing the ball from the wheel 53 comprises a pivotally mounted member 55 and a pair of roll-off tracks which move the ball away from the wheel and cause the ball to exert pressure against the member 55, causing said member to pivot clockwise (in Fig. 3) about a pivot pin 56. When the ball reaches the top of the member 55, it falls off the wheel 53 and the roll-off tracks onto a rolling surface 57 from which it moves onto a return track 57a to be returned to the players' end of the alley. A switch 252 is mounted on the stationary portion of the machine, as the frame of the roll-off tracks, in a position to be actuated by the pivotal movement of the member 55. This switch is utilized in one of the operating cycles of the machine as will be more fully hereafter described.

The magazine F includes a rotatable disk 58 carrying a plurality of pin holding devices 59 and having thereon a plurality of outwardly extending Geneva motion actuating members 60.

While the ball is being delivered to the players' end of the alley and the pins are being loaded into the magazine F, the sweep 43 is returned to its forward position, the standing pins are replaced on the alley bed, and the sweep and guard are raised to their inoperative position. The alley is then in readiness for the second ball of the frame to be rolled, and upon the rolling of this ball the machine operates to clear the alley of all pins and to set a new group of pins in readiness for the next frame.

While the machine preferably is arranged normally to operate through a two ball or spare cycle as above described since this is the condition most commonly encountered in the game of bowling, the control circuit is arranged automatically to change the operation of the machine to handle other situations encountered. Thus, in the event a strike is bowled wherein all ten pins are knocked down by the first ball so that none of the switches 156 are actuated when the pickup bars 52 close, the machine is arranged to sweep the alley and immediately set a new group of pins thereon. As pointed out above, in the event a pin is left standing but is knocked so far off its normal spot that it cannot be handled by the machine but is struck by the grid 50 as the pickup mechanism is lowered to search position, relative movement between the pickup grids actuates one or more switches to change the operation of the machine. As an additional feature, the control circuit provides an arrangement whereby, upon the operation of a switch, the machine removes pins from the alley and acts to return a predetermined number of successively rolled balls (as five). At the completion of the rolling of these practice balls the pins are reset on the alley and the machine automatically is reconverted to handle a normal game of bowling.

A control circuit designed to operate the pin-setting machine through the cycles above generally described is shown schematically in Fig. 4. The control circuit is so arranged that the machine finishes each cycle of operation after having set ten pins on the alley bed, and with the pickup unit and the sweep and guard in their elevated or rest positions. Preferably suitable interlocks are provided so that the machine cannot be turned off until it has completed its cycle.

Main control circuits

Power for the control circuit is furnished from a conventional commercial source of voltage. While a 110 volt, 60 cycle, single phase source of voltage may be used if desired, part of the apparatus illustrated in Fig. 4 is designed to be operated from a 220 volt, 60 cycle, 3 phase line, the lead-in wires of this line being designated at 70, 71 and 72. A manually operated safety switch 73 is provided in series in the line, and fuses 74a, 74b and 74c are preferably provided, one in each lead-in wire. The voltage from the line is delivered through a conventional motor starter 75 to a motor 76 which comprises part of the drive means E and is located above the pit, and through which power is obtained for driving the pit conveyor C, the pin elevator D including the sorter wheel 53 and the vertical conveyor belts 29 and 30, the conveyor 31, the indexing mechanism for the magazine F, and the pin changing mechanism K. The particular motor illustrated is a 220–208 volt, 3 phase, 60 cycle, 1750 R. P. M. induction motor. A parallel branch of the voltage source is delivered through another conventional motor starter 77 to another motor 78 which may be similar to the motor 76 and which is connected for driving the pinsetting mechanism, the pick-up mechanism and the guard and sweep apparatus.

A double pole single throw toggle switch 80 is provided at the attendant's desk, this switch being operable to turn the machine on and off. One pair of terminals of the switch 80 is connected by a pair of leads 81 and 82 to a separate source of voltage, which may be a conventional 110 volt, single phase, 60 cycle source. If desired, of course, the 110 volts may be tapped off the 220 volt source, as is well understood in the art, or in the event 110 volt motors are used in place of the motors 76 and 78, the control circuit including the switch 80 may be connected across a single 110 volt line. It may be desirable to connect the control switch 80 in such manner as to balance the 3 phase system when a plurality of pin setting machines are installed on adjacent alleys. This may be done by connecting the control system of the machine on the first bowling alley to one of the lead-in wires, the control system for the machine on another alley to another of the lead-in wires, the control system of a third machine on another alley to the third lead-in wire, etc.

When the attendant closes switch 80, power is applied through the leads 83 and 84 to the respective holding coils of the motor starters 75 and 77 and to the holding coil of a contactor 85 which connects a transformer 88, described more fully hereinafter, to the source. All of these units are provided with overload protection which operates contacts in the holding coil circuit, and because of the series connection of the holding coils an overload in any unit shuts down the entire machine. A pilot light 86 is connected across one of the holding coils (the coil of motor starter 77 as illustrated) so that when said coil is energized the pilot light 86 indicates that the machine is running. A latching relay 87 has two sets of contacts 87a and 87b which are connected across the switch 80 so that the machine can be turned off by means of the switch 80 only when the relay 87 is operated.

The relay 87, as well as certain other relays included in the circuit, is of the type commonly known as a latching relay and includes two separate coils, one end of each being connected to ground. One of the coils is utilized to operate the contacts of the relay, and the relay is so constructed that once operated the contacts are latched in operated position. The second coil, when energized, releases the latch and allows the contacts to return to released position. The relay 87 is so constructed that each of its two pairs of contacts 87a and 87b are closed when the relay is in released position, said contacts being opened when the relay is operated.

Control voltage for the system is obtained from the 110 volt source by means of a step-down transformer 88 having a primary 88a connected across the 110 volt line one lead being connected directly to the source and the other connected to the contactor 85, and a secondary 88b which is connected to a rectifier 89. One output terminal (the negative terminal as illustrated) of the rectifier may be connected to ground as shown, or a return wire common to the entire control system may be used; and the other output terminal (the positive terminal as illustrated) is connected to a main control lead 90. The transformer 88 and rectifier 89 are so designed and arranged that 28 volts D. C. appears between the lead 90 and ground.

A manually operable safety switch 91 is provided in the lead 90 so that any time when the machine is running the attendant can cut out the control voltage so that pins may be swept from the alley and the alley may be cleaned without danger that the machine will operate. A pilot lamp 92 is provided to indicate when the switch 91 has been moved to its position other than that shown in Fig. 4 to open the lead 90, and a push button switch 93 is also provided for operation after the alley has been cleaned, this switch being connected in a lead 93a so that closure of this push button through lead 97 indexes the stepping switch hereinafter referred to and causes the machine to run through a cycle, which due to the absence of pins will be a strike cycle, and place a new set of pins on the alley bed.

*Stepping switches*

The sequential operation of the machine is obtained through two stepping switches, 100 and 101, the switch 100 directing the machine through the cycles required in a game of bowling, and switch 101 directing the machine through its practice cycle. The stepping switches are shown schematically in Fig. 4, and the mechanical construction of one of the switches is shown in Figs. 5 and 6. The switch 100 comprises four groups or layers of stationary contacts, these layers being designated as 100a, 100b, 100c and 100d as shown in Fig. 6 and being mounted around a semi-circular form member 100f. As shown in Fig. 5 there are 25 contacts in each layer, these contacts being equally spaced one from the other and each contact being mounted in an insulating member 102 so that each contact is insulated from each other contact and each layer is insulated from each other layer.

An actuating coil or solenoid 100e has a core 103 which is pivotally mounted on a pin 104 and which has an extension 103a also pivotal about the pin 104. The extension 103a carries a pawl 105 which cooperates with a ratchet 106 mounted on a pin 107 which is mounted on the switch framework near the center of the semi-circle defined by the contacts 1–25 of the respective layers 100a–d. Rotatable with the ratchet 106 is a movable contact member 108 having oppositely extending contact arms 108a and 108b which engage the layers 100a–d in alternate cycles. An oppositely disposed spring pawl 109 engages the ratchet 106 in order to prevent reverse rotation of said ratchet. A spring 110 is affixed between the switch framework and the extension 103a of the core and urges said core to release position, while another spring 111 holds the pawl 105 in engagement with the teeth of the ratchet. It will be obvious that whenever the solenoid 100e is energized the extension 103a of the core will pivot about the pin 104, the right-hand end (as the parts appear in Fig. 5) of said extension moving downwardly so that the pawl 105 slips over the teeth of the ratchet 106. When the solenoid 100e is deenergized the spring 110 moves the right-hand end of the extension 103a upwardly and the engagement of the pawl 105 with the ratchet teeth causes the ratchet wheel 106 and the movable contact 108 to rotate in a clockwise direction. The parts are arranged such that the amount of rotation is just sufficient to move the engaging fingers of the movable contact 108 from one of the stationary contacts to the next adjacent stationary contact on each layer of contacts, there being four fingers on each of the arms 108a and 108b of the movable contact 108, each finger engaging one of the stationary contacts on each layer 100a–d.

Since the pin 107 is near the center of the semi-circle defined by the stationary contacts, when the movable conact arm 108a moves off of the last stationary contact 100a25, the oppositely disposed contact arm 108b will engage the contact 100a1, so that each time the movable contact completes one half revolution the switch automatically "homes" and is in position to start a new cycle.

Since in no case is it necessary to utilize all 25 of the contacts on each layer 100a–d in the circuit under discussion, means are provided for causing said switch to "home" before one half revolution is completed by the movable contact. This means comprises a pair of normally closed contact points 112a and 112b. By connecting one of these contact points through the solenoid 100e to ground and by connecting the other of said points to the source of control voltage (as the lead 90) through all of the unused stationary contacts in series, the switch may be made to "home" automatically when it reaches the first of the contacts which are connected in series. The engagement of the movable contact 108 with the first of the series connected contacts will send an electrical impulse through the closed contacts 112a and 112b to energize the solenoid 100e. As explained above, this causes the core extension 103a to move downwardly so that an actuating member 113 on said core extension opens the breaker points 112a and 112b, thus de-energizing the solenoid 100e so that the spring 110 returns the core extension 103a to its upper or release position. One of the breaker points, as the breaker point 112b, is mounted in a spring member 114 so that the points are again closed and the action is repeated, the stepping switch operating in the manner of a doorbell buzzer until it reaches its "home" position.

Referring again to Fig. 4, a branch 90a of the control lead 90 is connected to one terminal of each of a plurality of normally open switches 94a–f, and the other terminal of each of these switches is connected to a lead 95 so that the switches are all connected in parallel.

The switches 94a–f are shown in Fig. 3 as being located in panels beneath the belts 23, 24 and 25 on the floor of the pit so that when the ball is rolled and falls into the pit one or more of these switches is momentarily closed. When one of the switches is closed, an impulse of current flows through the leads 90 and 90a, one of the switches 94, the lead 95, a pair of contacts 96a of a latching relay 96, and a lead 97 which extends from said contacts to the first contact of layer 100d of the stepping switch 100. This layer is used for indexing purposes. Since at the initiation of a cycle of operation of the machine the movable or rotary contact 108 of the stepping switch is in engagement with the first stationary contact of the switch, the current impulse continues through a lead 98, back through another normally closed pair of contacts 96b of the relay 96, through a lead 99 which extends from the contacts 96b to the operating solenoid 100e of the stepping switch 100, and thence through said solenoid to ground. Energization of solenoid 100e indexes the stepping switch to position 2 so that the associated fingers on rotary contact arm 108a engage the second contact on each of the layers 100a–d of stationary contacts.

The layer 100a is utilized to direct the machine through a normal two ball cycle of operation, and its associated fingers on rotary contact arms 108a–b are connected to the control lead 90 by means of a lead 130, contacts 131a of a latching relay 131 which is energized when the machine finds a pin standing in a dead area where it cannot be handled by the pickup mechanism, and a lead 132 which extends from the contacts 131a to contacts 133a of a latching relay 133 which is energized when the machine finds that all ten pins on the alley bed have been knocked down by the first ball, and which is used to take control of the machine away from the layer 100a of the stepping switch 100 and vest such control in the layer 100b to direct the machine through a strike cycle. A lead 134 extends from the movable one of the contacts 133a to contacts 135a of another latching relay 135 which is used to shift control of the machine to the practice cycle under the direction of stepping switch 101. The movable one of the contacts 135a is connected to the control lead 90.

Consequently, control voltage is applied from the second stationary contact on layer 100a to a relay 140, a lead 141 connecting said contact to said relay, and the other terminal of the relay being connected to ground. A lead 142 connects the control lead 90 to one of the normally open contacts 140a of the relay 140, the other of said contacts being connected to ground through a clutch operating solenoid 143 (see Fig. 2) which, when energized, connects the drive from the motor 78 to bring the guard and sweep down from its rest position to an operating position adjacent the alley bed.

At the same time the relay 87 in the attendant's control circuit is unlatched, a lead 144 extending from the lead 141 to ground through the unlatching coil of said relay. This action closes the contacts 87a and 87b of said relay and prevents the machine from being turned off by means of the switch 80 until the latching coil of the relay is again energized.

As the guard and sweep approach the alley bed, the normally open micro switch 150 (Figs. 3 and 4) is closed by an operating member 150a carried by the rack 39. One terminal of the switch 150 is connected to the lead 90 by a lead 151, and the other terminal is connected to the movable one of contacts 135b of the relay 135 by a lead 152, and thence by a lead 153 to the second stationary contact of the index layer 100d of the stepping switch 100. In the same manner as described previously the control voltage is applied to the solenoid 100e to index the stepping switch to position 3. The third contact of the layer 100a of said stepping switch is connected to a relay 154 by means of a lead 155, and one of the normally open contacts 154a of this relay is connected to the control lead 90 by means of a lead 154a, while the other of said contacts is connected to a solenoid 154b (Fig. 2), this solenoid applying power from the motor 78 to bring the pickup mechanism down to its search position.

As the pickup moves down it may find one of three conditions existing: one or more pins standing, all standing pins being on or adjacent their normal spots so that they can be handled by the pickup mechanism, in which event the machine continues on its normal two ball cycle; no pins standing, in which event the machine is shifted into its strike cycle; one or more pins standing so far off the normal pin spot that such pin or pins cannot be handled by the pickup mechanism, in which event the machine is shifted into a "dead area" cycle.

Assuming that one or more pins are standing and that all standing pins are in a position to be handled by the machine, the pickup arms 52 close so that the pins are grasped and are ready to be picked up from the alley bed. As pointed out earlier, closure of each pair of pickup arms about the neck of a standing pin causes actuation of a normally closed switch 156 carried by said pair of pickup arms. In the preferred embodiment of this invention, there are 15 pairs of pickup arms and 15 switches 156a–o. The location of one of these switches on one of the pickup arms is shown in Fig. 3 and only four of the switches are shown schematically in Fig. 4, all 15 of the switches being connected in series. The opening of one or more of these switches as a pin is grasped disables the machine from entering its strike cycle.

As the pickup frame approaches the alley bed, the lower grid 50 is stopped in the pin pickup position while the upper grid 49 overtravels so that an actuating member 49a carried by said grid closes a normally open microswitch 157. This overtravel of grid 49 is not sufficient to actuate the dead area detector switches hereinafter referred to since the grid 50 has traveled down to a pin pickup position. One terminal of this switch is connected to the control lead 90 by means of a lead 158, and the other terminal of the switch is connected by a lead 159 to the movable contact of relay contacts 96c associated with relay 96, a cooperating stationary contact of this group being connected by means of a lead 160 to the third stationary contact of the indexing layer 100d of the stepping switch 100, sending an impulse of current through the solenoid 100e and indexing the stepping switch to position 4. Another normally open microswitch 161 is closed by relative movement between the grids 49 and 50. One terminal of the switch 161 is connected to the control voltage lead 90 by the lead 158 and the other terminal is connected by a lead 162 through the switches 156a–o to a strike holding relay 163. However, since at least one of the switches 156a–o is open, the strike holding relay 163 is not energized.

Control voltage from the fourth stationary contact on the layer 100a of the stepping switch 100 is applied to a relay 165 through a lead 166. Closure of the normally open contacts 165a applies control voltage through the lead 155a to a solenoid 167 shown schematically in Fig. 4 and mechanically in Fig. 2. This solenoid is arranged to apply power from the motor 78 to drive the pickup mechanism upward. In its upward movement the actuating member 49a actuates a normally open microswitch 168 which causes the pickup unit to stop in an intermediate or dwell position, the switch 168 being connected through the 4th stationary contact of the index layer 100d of the stepping switch 100, causing said switch to index to position 5. The switch 168 has one lead connected to the voltage source through the 4th contact of switch 100a and contact member 108. The interconnection of the 5th and 2nd stationary contacts on the normal layer 100a of the stepping switch again energizes the relay 140 (through the lead 141), with consequent energization of the solenoid 143 so that the sweep mechanism is driven by the motor 78.

As more fully explained in the application of George A. Montooth, Serial 2,205, a planetary gear arrangement in the sweep and guard mechanism operates to drive the sweep and guard down from their rest position to their operative position and to drive the sweep to the rear of the alley bed, power being transferred from the guard to the sweep when the guard reaches its position adjacent the alley bed. In a similar manner when the sweep is driven forwardly of the alley on its return run, power is transferred from the sweep to the guard when the sweep reaches its forward limit of travel.

At the end of the movement of the sweep to the rear of the alley a normally open microswitch 170 is closed by an actuating member 170a (see Fig. 3) carried on the sweep rack. One terminal of the switch 170 is connected to the control voltage lead 90 through the lead 151 and the other terminal of said switch is connected to the 5th stationary contact of the indexing layer 100d of the stepping switch 100, causing said stepping switch to index to position 6. The 6th contact on the normal layer 100a is connected through a lead 171 to a relay 172 so that said relay is energized by the control voltage. The normally open contacts 172a of relay 172, when closed, apply control voltage through the lead 155a to a solenoid 173 (see Fig. 2) which causes the sweep to return to its forward position adjacent the guard. As the sweep approaches its forward position a normally open microswitch 174 is closed by an actuating member 175 on the sweep rack (see Fig. 3). Switch 174 is connected between the 6th stationary contact on the normal layer 100a of the stepping switch and the 6th stationary contact on the indexing layer 100d of said stepping switch by a lead 176, thus causing the stepping switch to index to position 7. The 7th stationary contact on the layer 100a of the stepping switch is connected to the lead 155 so that the relay 154 and the solenoid 154b are energized, causing the pickup mechanism to move downwardly and reset the pins on the alley bed. At the bottom of the pickup travel the switch 157 is closed and this switch being connected through the lead 159, relay contacts 96c, and lead 160 to the 7th stationary contact on the indexing layer 100d of the stepping switch causes the stepping switch to index to position 8.

The 8th stationary contact on the normal layer 100a is connected by means of a lead 177 to energize a relay 178, this relay having two pairs, 178a and 178b, of normally open contacts. One terminal of each of these contacts is connected to the control voltage lead 90 through the lead 155a and the other terminal of contacts 178a is connected to the solenoil 173 by the lead 179 to start the guard moving toward its rest position, while the other terminal of the contacts 178b is connected to the solenoid 167 by a lead 180 to bring the pickup mechanism to its top position. The mechanical operation of the machine is so timed that from its lower or search level the pickup mechanism will reach the top of its travel before the guard reaches its rest position.

When the pickup unit reaches the top of its travel the actuating member 49a closes a switch 181, one terminal of which is connected to the control voltage lead 90 by the lead 158 and the other terminal of which is connected to position 8 on the indexing layer 100d by a lead 182, causing the stepping switch 100 to index to position 9. The 9th stationary contact on layer 100a of the stepping switch applies power through the relay 172 to maintain solenoid 173 energized and bring the guard and sweep to their rest postion where the arm 38 closes a microswitch 183, one terminal of which is connected to the source of control voltage through the lead 151 and the other terminal of which is connected through contacts 96d of relay 96 to the 9th stationary contact on the indexing layer 100d. This last described connection is made by means of a lead 184 which incorporates the movable and one of the stationary contacts 96d.

At this point the machine is ready for a rolling of a second ball. The cycle following the rolling of the second ball is similar to the first ball cycle above described, the chief difference being that the search operation is omitted. As in the cycle above described, the weight of the ball in the pit closes one or more of the pit switches 94a–f, sending an impulse through the lead 95, relay contacts 96a, lead 97, and lead 97a to the 10th stationary contact on the index layer 100d of the stepping switch 100, causing the stepped switch to be indexed to position 11. The 11th stationary contact on the normal layer 100a of the stepping switch is interconnected with the second stationary contact on said layer 100a, causing energization of relay 140 and solenoid 143 to bring the guard and sweep to their operative position. At this point in the cycle the microswitch 150 is ineffective to cut off the power from the motor 78 since the lead 153 from said switch is connected only to the second stationary contact of the index layer 100d and the sweep continues its motion through the planetary gear assembly, moving to the rear of the alley bed to sweep pins therefrom. At the end of its rearward movement the sweep closes switch 170 which is connected between the source of control voltage and the 11th stationary contact of the index layer 100d of the stepping switch, causing the stepping switch to be indexed to position 12. Stationary contact 12 on the normal layer 100a of the stepping switch is interconnected with stationary contact 6 on said layer, applying power through the lead 171 to energize the relay 172 and the solenoid 173 to move the sweep back toward its position adjacent the guard where the actuating member 175 closes the switch 174 which is connected to the 12th stationary contact on the index layer 100d of the stepping switch and causes the stepping switch to index to position 13.

The 13th stationary contact of the normal layer 100a is connected by means of a lead 190, a pair of contacts 191a of a latching relay 191, and a lead 192 to the lead 155 and hence to the relay 154, energizing the solenoid 154b to bring the pickup down. Since the pickup was in its topmost position, the machine is arranged so that the pickup will carry the pinsetting unit G down with it if the setter interlock is in the proper relation.

The setter interlock which prevents the setter unit from going down with the pickup unit unless ten pins are in the pinsetter functions as follows: the 10th pin trips the pin magazine F, dumping pins into the pinsetter, a mechanical interlock (not shown here) preventing dumping the pins when the setter unit is already loaded with a full complement of pins. In order clearly to understand the operation of the setter interlock, it is necessary to consider its operation in two cases. First, when the setter is full of pins and the magazine also contains a complete complement of pins and is ready to dump its pins into the pinsetter; and second, when pins have been dumped from the magazine into the pinsetter and the other set of pins utilized by the machine are either on the alley or are in the pit being fed back to the pin magazine. The first case above set forth is only a temporary condition, for in the normal course of operation of the machine the setter will go down to set pins on the alley, and when the setter returns, the pins in the magazine are dumped into the setter, setting up the conditions of case 2 above set forth which is normally found in the operation of the machine. The pins on the alley are knocked or swept into the pit and the conveyor mechanisms in the pit commence feeding the pins back to the magazine F. The first pin which enters the magazine indexes the magazine and operates the setter interlock switch 193, this action occurring when a finger 60a on the bottom of one of the Geneva motion arms 60 on the magazine closes the switch 193 so that the relay 191 becomes energized and its contacts 191a are closed, the switch 193 being in a lead 194 which connects with the lead 158, said lead 158 being connected to the control voltage lead 90. A finger 196 on the setter unit closes a switch 197 (see Fig. 3) as the setter returns to its top position. One terminal of the switch 197 is connected to the 14th stationary contact of the normal layer 100a of the stepping switch by means of a lead 198, and the other terminal of the switch 197 is connected to the unlatching coil of the setter interlock relay 191 so that the closure of the switch 197 unlatches the setter interlock.

As the setter unit reaches the bottom of its travel, it closes a normally open microswitch 200. This switch is shown in Fig. 3 and illustrated schematically in Fig. 4. One terminal of the switch 200 is connected to the control voltage source through the lead 158 and the other terminal of the switch is connected by a lead 201 to the 13th stationary contact of the indexing layer 100d of the stepping switch 100, causing the stepping switch to be indexed to position 14. The 14th stationary contact on the normal layer 100a is interconnected with the 8th stationary contact on said layer so that relay 178 is energized, causing the pickup unit to rise to its top position and deposit the setter in its stowed position. The machine is so timed that the setter reaches the top of its travel before the guard, and when the pickup contacts the microswitch 181, which is connected through the lead 182 to the 14th stationary contact of the index layer 100d, the stepping switch is indexed to position 15. From this position the 15th stationary contact of the normal layer 100a causes control current to energize the relay 172 through the lead 171 to take the guard and sweep to their rest position where the guard arm 38 closes the switch 183 which is connected through contacts 96d of the latching relay 96 and through lead 184 to the 15th stationary contact of the indexing layer 100d, causing the stepping switch 100 to be moved to position 16.

As explained earlier, the stationary contacts 16–25 of the normal layer 100a of the stepping switch 100 are connected through breaker points 112 so that the switch 100 automatically indexes itself to "home" position ready for the next frame. As the switch reaches its "home" position current from the control source through the first stationary contact of the layer 100a of the stepping switch is connected to the latching coil of relay 87 through a lead 202, thus energizing such coil and placing the operation of the machine under the control of the on-off switch 80.

Strike cycle

In the event the first ball rolled knocks down all the pins, the machine operates in the manner described above in connection with the first ball of a normal two ball cycle until the pickup bars 52 close. Since no pins are standing, none of the switches 156a–o are opened so when the switch 161 is closed by the pickup unit at the bottom of its travel a signal is sent through the lead 162 (including the series connected closed switches 156a–o) to energize the strike hold relay 163. At the same time closure of the microswitch 157 by the pickup unit at the bottom of its travel indexes the stepping switch 100 to position 4 in the manner previously described.

Energization of the strike hold relay 163 closes its normally open contacts 163a, energizing a grid unlatch solenoid 210 through a lead 211 which connects to the control voltage lead 90a. Another lead 212 connects control voltage to the latching coil of the strike latching relay 133, causing the movable contact associated with this relay to move from engagement with the upper stationary contact into engagement with the lower stationary contact of the contacts 133a. Since said upper contact connects to the fingers of movable contact arms 108a–b associated with the layer 100a of the stepping switch and the lower of said stationary contacts connects by means of a lead 213 to the fingers of movable contact arms 108a–b associated with the strike layer 100b of the stepping switch, the control of the machine is taken from the normal layer 100a of the stepping switch and is vested in the strike layer 100b.

As may be seen in Fig. 4, the 4th, 5th, 6th and 7th stationary contacts of the strike layer 100b are connected to the self-indexing circuit, and the stepping switch 100 indexes itself to position 8. The 8th stationary contact of the strike layer 100b is connected by a lead 214 to lead 166 so that the relay 165 is energized and the pickup unit H is carried to the top of its travel where it contacts switch 181, causing the stepping switch 100 to index to position 9, as described in connection with the normal two ball cycle. The 9th and 10th stationary contacts on the strike layer 100b are connected to the automatic indexing circuit comprising contacts 16 to 25 of layer 100a, so the stepping switch is automatically indexed to position 11 and since positions 11, 12, 13, 14, 15 and 16 on the strike layer 100b are interconnected with the normal layer 100a, the balance of the cycle is a repetition of the normal two ball cycle above described under the control of contacts 11 to 16 of layer 100a.

Dead area cycle

In the event one or more pins are left standing, but are so far off their normal spots that they cannot be handled by the machine, the machine is shifted into a dead area cycle. Upon the rolling of a ball the machine starts to operate on its normal two ball cycle until the pickup unit descends. If a pin is in an area where it cannot be handled by the machine, the pin is struck by a bumper plate (not shown) carried by the lower grid 50 of the pickup unit. This causes at least a portion of the grid 50 to stop, while the other grids continue their downward movement, and the relative movement between the grids energizes one or more of three normally open switches 215a–c. These switches are shown schematically in Fig. 4, and one of the switches is shown in Fig. 3, together with an actuating cam 216 carried by the center grid 49. There is one dead area switch 215 at each corner of the triangular grid, so that no matter where an off-spot pin may be found, at least one of these switches will be closed. Referring again to Fig. 4, the three dead area switches 215a–c are connected in parallel, one terminal of each of the switches being connected to the control voltage lead 90a by means of the lead 211 and the other terminal of each of the switches being connected to a lead 217 which connects with the latching coil of the dead area latching relay 131. Energization of this relay causes its associated movable contact to move out of engagement with the upper stationary contact 131a and into engagement with the lower contact, disconnecting the fingers on movable contact arms 108a–b associated with the layer 100a of the stepping switch from the control voltage circuit and connecting the fingers on movable contact arms 108a–b associated with the layer 100c of the stepping switch, by means of a lead 218, into the control voltage circuit. The layer 100c and fingers on movable contact arms 108a–b associated therewith control the machine through the dead area cycle.

On the dead area layer 100c, the 3rd, 4th, 5th, 6th and 7th stationary contacts are connected to the automatic indexing circuit so that the stepping switch 100 is automatically indexed to position 8. The 8th and 9th stationary contacts on the layer 100c are interconnected respectively with the 8th and 9th contacts on the normal layer 100a so that the machine operates through the portion of the normal cycle described above in connection with positions 8 and 9. When the stepping switch 100 is indexed to position 10, control of operation of the machine is returned to the normal layer 100a before the rolling of the second ball, since the 10th stationary contact on the layer 100c is connected by means of a lead 219 to the unlatching coil of the dead area latching relay 131.

Practice cycle

As pointed out earlier, it is desirable to provide a practice cycle wherein standing pins are cleared from the alley bed and the machine operates to return a plurality of successively rolled balls, without searching, setting pins or sweeping the alley between successive balls. At the completion of the rolling of a predetermined number of balls a complete set of pins is placed on the alley so that the machine is ready for normal play. While the machine may be arranged so that any desired predetermined number of balls may be rolled, in the apparatus disclosed herein the machine is arranged to return five successively rolled balls and then to complete the practice cycle by placing a set of pins on the alley bed. Since in league bowling each team usually comprises five persons, each person on the team may roll one practice ball. If desired the arrangement can be changed so that any predetermined number of balls can be rolled. Obviously, the practice cycle must be initiated manually.

Because of substantial differences between the practice cycle and the cycles utilized in a normal game of bowling, a separate stepping switch 101 is used and separate actuating switches are used. This stepping switch has layers 101a and 101b. When the machine is conditioned for a first ball the finger on the rotary contact arm 108a associated with the normal layer 100a of stepping switch 100 is in engagement with the first stationary contact on said normal layer, so that a relay 230 is energized, control voltage being applied to this relay through leads 231 and 202 which connect the relay coil with the first stationary contact of the normal layer 100a. Consequently, normally open contacts 230a and 230b are closed so that, in the event a "practice" push button 232 is manually closed, control voltage will be applied to cause the practice relay 135 to latch in. This circuit may be followed from the lead 90 through the lead 155a, a lead 234, the "practice" push button 232, a lead 235 incorporating the closed contacts 230b, and the latching coil of the relay 135 to ground. This shifts control of the machine from the stepping switch 100 to the practice stepping switch 101 since movement of movable relay contact 135a to a position where it engages its cooperating lower stationary contact opens the circuit through the lead 134 and closes a circuit through a lead 236 which is connected between said lower stationary contact and the rotary contact of one of the layers 101a of the stepping switch 101. Since the first stationary contact on the layer 101a is connected by leads 237 and 141 to the relay 140, said last mentioned relay is energized, causing the guard and sweep to descend to the alley bed.

In order to use as few extra switches as possible, the relays 135 and 96 are used to shift the circuits completed by closure of the microswitches operated by movement of parts of the machine from the indexing layer 100d to an indexing layer 101b of the stepping switch 101. In this regard, the relay 135 functions to shift control from the normal layer 100a of the stepping switch 100 to the practice layer 101a of the stepping switch 101; to shift the guard operated switch 150 from a circuit which includes the stepping switch 100 to a circuit which includes the stepping switch 101; to connect the latch in coil of the relay 96 so that it will latch in at position 2 of the practice layer 101a of the stepping switch 101; and to connect the operating solenoid 101e of the stepping switch 101 to ground. The relay 96 functions to shift the guard operated microswitch 183 to the practice cycle; to shift the pit switches 94 to the practice cycle; to disconnect the operating solenoid 100e of the stepping switch 100; and to shift the microswitch 157 which is operated by the pickup unit at the bottom of its travel to the practice cycle.

When the guard descends and closes the switch 150, since the lead 152 is now connected with the lower stationary contact of relay contacts 135b an impulse of current is delivered through a lead 238 to the first stationary contact on the indexing layer 101b of the stepping switch 101. This impulse travels through the rotary contact of such layer, through a lead 239, through the solenoid 101e, and through a lead 240 which connects said solenoid to ground through the now closed contacts 135c of the practice relay 135, and the stepping switch 101 is indexed to position 2.

The 2nd stationary contact on the practice layer 101a of the stepping switch is connected to the relay 154 by means of lead 241 which connects with lead 155 (through lead 192) thus causing energization of the solenoid 156 to bring the pickup unit down. At the bottom of its travel the pickup unit closes switch 157 which is connected between the control lead 90 and the 2nd stationary contact on the indexing layer 101b of the stepping switch 101 by leads 158, 159, the lower stationary contact of contacts 96c of the relay 96, and lead 242, which indexes the stepping switch 101 to position 3, the relay 96 having been latched in by control voltage applied through the 2nd stationary contact on the practice layer 101a through lead 241, contacts 135d of the relay 135 and lead 243. The 3rd stationary contact on the practice layer 101a of the stepping switch 101 is connected to the relay 165 by means of leads 244 and 166 so that the solenoid 167 is energized to move the pickup together with all the standing pins from the alley. As the pickup unit reaches its dwell position the actuating arm 49a (see Fig. 3) closes a switch 245. One terminal of this switch is connected to the source of control voltage when the machine is in its practice cycle by means of a lead 246 which connects with the lead 236, and the other terminal of the switch 245 is connected through a lead 247 to the 3rd stationary contact of the indexing layer 101b, indexing the stepping switch 101 to position 4.

The 4th stationary contact of the practice layer 101a is connected by a lead 248 to the lead 171 which runs to ground through the relay 172, thus causing energization of this relay and consequent energization of the solenoid 173 to move the sweep to its rest position where the guard closes switch 183 and indexes the switch 101 to position 5. The circuit is as follows: the switch 183 is connected between the 4th stationary contact on the indexing layer 101b and the source of control voltage, one terminal of said switch is connected to the control lead 90 by the lead 151 and the other terminal of said switch is connected to said 4th terminal by lead 184, the lower stationary contact of contacts 96d and lead 250.

Since the pins have been picked up and the guard and sweep moved to their rest position the machine is ready for the first practice ball. When the ball enters the pit it closes one or more of the switches 94a–f. Since the relay 96 is latched in, the movable one of the contacts 96a which is connected to the switches 94a–f by the lead 95 engages its lower associated stationary contact, and this stationary contact is connected to the 5th stationary contact of the indexing layer 101b by means of lead 251, indexing the stepping switch 101 to position 6. The 6th stationary contact on the practice layer 101a is interconnected with the 1st stationary contact on said practice layer so that relay 140 and solenoid 143 are energized in the manner above described to bring the guard and sweep down and close switch 150. Since stationary contacts 6 and 1 on the indexing layer 101b are interconnected, the pulse of control current delivered through lead 238 indexes the switch 101 to position 7. A normally open switch 252 is so located, as may be seen in Fig. 3, that it is closed by the pivoting action of the ball return member 55, this switch acting to hold the sweep and guard down until the ball is delivered to the ball return track. One terminal of the switch 252 is connected to the source of control voltage through the lead 246 and the other terminal is connected by a lead 253 to the latching coil of a relay 254, and the normally open contacts 254a of this relay are connected between contact 4 on the one hand (by a lead 255) and contacts 7, 10, 13 and 16 of the practice layer 101a on the other hand (by lead 256) to provide this delay action. When the relay contacts 254a are closed, the 7th stationary contact on the practice layer 101a is connected by lead 256, relay contacts 254a, lead 255, lead 248, and lead 171, to relay 172 so that when the pivotal movement of the member 55 causes closure of the switch 252, relay 172 and solenoid 173 are energized to move the guard and sweep to their rest position where they contact switch 183. Since the 4th, 7th, 10th, 13th and 16th stationary contacts of the indexing layer 101b are interconnected, the current impulse through lead 250 indexes the switch 101 to position 8.

The machine repeats the action just described for the rolling of three more balls, and the first two steps are repeated upon the rolling of the 5th ball until the stepping switch 101 is indexed to position 19. The 19th stationary contact on the practice layer 101a is interconnected with the 2nd stationary contact so that relay 154 is energized by a current pulse through leads 241 and 155 causing the pickup unit H to move down and reset the pins. The pickup unit closes switch 157 at the bottom of its travel, sending a pulse of control current through lead 159, relay contacts 96c, lead 242 and the 2nd stationary contact on the practice layer 101b, which is interconnected with the 19th stationary contact on said practice layer to index the stepping switch 101 to position 20. The 20th stationary contact on the practice layer 101a is interconnected with the 3rd stationary contact on said practice layer, so that control current is sent through lead 244 and lead 166 to energize relay 165 with consequent energization of solenoid 167 to take the pickup unit back to its dwell position slightly below its top position. If the pickup went to its top position, it would unlatch the setter unit G and set pins after the rolling of the first ball of the next two ball cycle. Consequently, a switch 260 is positioned so that it will be closed by the actuating arm 49a when the pickup unit reaches dwell position, as may be seen in Fig. 3. One terminal of this switch is connected to the source of control voltage through the lead 246 and the other terminal is connected by a lead 260a to the 20th stationary contact of the index layer 101b so that upon closure of the switch 260 the stepping switch 101 is indexed to position 21.

The 21st stationary contact on the practice layer 101a is interconnected with the 4th stationary contact on said layer, sending a control current impulse through leads 248 and 171 to energize relay 172 and solenoid 173 to bring the sweep and guard to their rest position. The movement of the sweep and guard closes switch 183 which is connected through lead 250 to the 21st stationary contact on the indexing layer 101b, indexing the stepping switch 101 to position 22. The 22nd, 23rd, 24th and 25th contacts on the practice layer 101a are connected in series with solenoid 101c through breaker points 261. These points are similar in construction and operation to the breaker points 112a and 112b utilized on the stepping switch 100 so that the switch is automatically indexed to its "home" position, and relays 96 and 135 are unlatched so that operation of the machine is returned to the control of stepping switch 100. This unlatching is accomplished by a connection from the 25th stationary contact of the indexing layer 101b through a lead 262 which connects the unlatching coils of relays 96 and 135 to ground in parallel as the stepping switch 101 reaches its "home" position.

*Additional controls*

A push button 265 is supplied at the players' end of the alley so that the player can reset pins in case of a foul or in case one extra ball is allowed after bowling a spare in the last frame of a game. One terminal of the switch 265 is connected to the source of control voltage by a lead 266 which connects with the lead 155a which in turn connects with the lead 90 and the other terminal of the switch 265 is connected to ground through the latching coil of a reset latch in relay 267. Once latched in this relay holds until the normal layer 100a of the stepping switch 100 returns to its "home" position where the finger on rotary contact arm 108a associated with the layer 100a engages the 1st stationary contact on the normal layer 100a. Since the unlatching coil of the relay 267 is connected to the 1st stationary contact on the layer 100a by leads 268 and 202, the relay 267 is unlatched when the stepping switch 100 reaches its home position. This arrangement allows the player to signal the machine at any time after the first ball is rolled, and the machine will go through a second ball cycle and complete its operation by setting new pins without further attention since the normally open contacts 267a of the relay 267 are connected to the normal layer 100a of the stepping switch by means of leads 269 and 270 to initiate a second ball cycle. The lead 270 is directly connected to position 10 of normal layer 100a.

At the attendant's desk a reset push button 271 is supplied, this push button being connected by leads 272 and 273 in parallel with the contacts 267a of the relay 267 so that the attendant can clear the machine in the event the players leave it after throwing a first ball. The push button 271 does not cause the relay 267 to latch in.

Another push button 275 is supplied at the attendant's desk to control the operation of the pin changing mechanism shown in Fig. 1. This push button is arranged to be effective to operate the pin changing mechanism only when the pinsetting machine is not operating so that the stepping switch 100 is in its normal position 1, one terminal of the push button 275 being connected by a lead 276 to the control lead 90 through the normally open contacts 230a of the relay 230. The relay 230 is energized when the movable contact 108 is in position 1 on layer 100a and is deenergized when contact 108 moves from position 1. The relay is connected to position 1 of the normal layer by leads 231 and 202. The function of this relay is to limit the operation of the pin changer to intervals when the machine is not in a pin setting cycle. The other terminal of the switch 275 is connected by means of a lead 277 through a normally closed switch 278 and a solenoid 279 to ground. The solenoid 279 is utilized to operate the pin changing mechanism as fully described in the application of George A. Montooth, filed March 11, 1948, as Serial No. 14,357, which is now Patent No. 2,621,045 granted December 9, 1952, and the switch 278 is an interlock switch on the chain track of the pin changing mechanism, this switch being so arranged that the switch 275 is ineffective until the pin changing mechanism has completed a cycle of operation. The pin changing mechanism when operated opens the switch 278 and closes the switch 278 when the cycle of the pin changing mechanism is completed.

We claim:

1. In a pinsetting machine having means for picking up standing pins, means for sweeping pins from the alley bed into the pit and drive means for said sweep and pickup means, in combination, control means comprising a source of control voltage, first electromagnetic means for controlling the operation of said sweep, second electromagnetic means for controlling the operation of said pickup means, separate circuits connecting said source of control voltage to said electromagnetic means, means of control voltage to said electromagnetic means, means in the pit operable in response to the rolling of a ball to close one of said circuits and energize said first electromagnetic means to apply power from said drive means to move said sweep from a position above the alley bed to a position adjacent the alley bed, and means operable in response to said movement to close the second of said circuits and energize said second electromagnetic means to apply power from said drive means to cause said pickup means to search for and pick up standing pins.

2. In a pinsetting machine having means for picking up standing pins, means for sweeping pins from the alley bed into the pit and drive means for said sweep and pickup means, in combination, control means comprising means operable in response to the rolling of a ball to apply power from said drive means to move said sweep from a rest position above the alley bed to an operative position adjacent the alley bed, means operable in response to said movement to apply power from said drive means to cause said pickup means to move downward to search for standing pins, means operated by said pickup means at the end of its downward movement to cause said pickup means to reverse and move to a position above the alley bed, means operated by said pickup means to cause said sweep to clear the alley bed and return, means operated by said sweep near the end of its return movement to cause said pickup means to move downward to reset pins on the alley bed, and means operated by said pickup means at the end of its downward movement to cause said pickup means and sweep to move to positions above the alley bed.

3. In a pinsetting machine having means for picking up standing pins, means for sweeping the pins from the alley bed into the pit and drive means for said sweep and pickup means, in combination, control means comprising a source of control voltage, first electromagnetic means for controlling the operation of said sweep, second electromagnetic means for controlling the operation of said pickup means, a switch in the pit operable in response to the rolling of a ball to energize said first electromagnetic means to apply power from said drive means to move said sweep from a position above the alley bed to a position adjacent the alley bed, a switch operated by said sweep near the end of said movement to energize said second electromagnetic means to apply power from said drive means to cause said pickup means to make a first move downward to search for standing pins, means including a switch operated by said pickup means at the end of its first downward movement to cause said pickup means to reverse and move to a position above the alley bed, means operated by said pickup means at a point above the alley bed to cause said sweep to move to the rear of the alley bed, a switch operated by said sweep at the rear of the alley bed to cause said sweep to reverse, a switch operated by said sweep near the end of its return movement to cause said pickup means to move downward a second time to reset pins on the alley bed, and means including a switch operated by said pickup means at the end of its second downward movement to cause said pickup means and sweep to move to positions above the alley bed.

4. In a pinsetting machine having means for picking up standing pins, guard means for protecting the machine against inadvertently rolled balls, means for sweeping pins from the alley bed into the pit and drive means for said guard, sweep and pickup means, in combination, control means comprising a source of control voltage, first electromagnetic means for controlling the operation of said guard and sweep in one direction, second electromagnetic means for controlling the operation of said guard and sweep in the opposite direction, third electromagnetic means for controlling the operation of said pickup means in one direction, fourth electromagnetic means for controlling the operation of said pickup means in the opposite direction, a switch in the pit operable in response to the rolling of a ball to energize said first electromagnetic means to apply power from said drive means to move said guard and sweep down from a position above the alley bed to a position adjacent the alley bed, a switch operated by said guard at the end of said movement to energize said third electromagnetic means to apply power from said drive means to cause said pickup means to make a first move downward to search for standing pins, means including a switch operated by said pickup means at the end of a first downward movement to energize said fourth electromagnetic means to apply power from said drive means to cause said pickup means to move to a position above the alley bed, a switch operated by said pickup means at a point above the alley bed to energize said first electromagnetic means to apply power from said drive means to cause said sweep to move to the rear of the alley bed, a switch operated by said sweep at the rear of the alley bed to energize said second electromagnetic means to apply power from said drive means to cause said sweep to reverse its movement, a switch operated by said sweep near the end of its return movement to energize said third electromagnetic means to apply power from said drive means to cause said pickup means to move downward a second time to reset pins on the alley bed, means including a switch operated by said pickup means at the end of its second downward movement to energize said second and fourth electromagnetic means to cause said pickup means to move to a position above the alley bed and said sweep to move to a position adjacent said guard, and a switch operated by said pickup means at the end of its upward movement to energize said second electromagnetic means to apply power from said drive means to cause the sweep and guard to move to positions above the alley bed.

5. In a pinsetting machine having means for setting pins, means for picking up standing pins, means for sweeping pins from the alley bed into the pit and drive means for the setting, pickup and sweep means, in combination, control means comprising a source of control voltage, first electromagnetic means for controlling the operation of said sweep in one direction, second electromagnetic means for controlling the operation of said sweep in the opposite direction, third electromagnetic means for controlling the operation of said setting means and pickup means in one direction, fourth electromagnetic means for controlling the operation of said setting means and pickup means in the opposite direction, means operable upon the rolling of a first ball to cause the machine to pick up standing pins, sweep the alley bed and reset said pins and operable in response to the rolling of a second ball to energize said first electromagnetic means to apply power from said drive means to cause said sweep to move from a position above the alley bed to a position adjacent the alley bed and to move along said alley bed to the rear thereof, a first switch operated by said sweep at the end of such movement to energize said second electromagnetic means to cause said sweep to reverse and move forwardly along said alley bed, a second switch operated by said sweep at a point in said forward movement to energize said third electromagnetic means to apply power from said drive means to cause said setting means to descend and set pins on said alley bed, means for preventing the operation of said setting means until said setting means contains a full complement of pins, a third switch operated by said setting means at the bottom of its travel to energize said fourth electromagnetic means to cause said setting means to move to a position above the alley bed, and a fourth switch operated by said setting means at the end of its upward movement to energize said second electromagnetic means to apply power from said drive means to cause the sweep to move to a position above the alley bed.

6. In a pinsetting machine having means for setting pins, means for picking up standing pins, means for sweeping pins from the alley bed into the pit and drive means for the setting, pickup and sweep means, in combination, control means comprising means operable in response to the rolling of a ball to apply power from said drive means to move said sweep from an out of the way position to an operative position adjacent the alley bed, means operable in response to said movement to apply power from said drive means to cause said pickup means to move downward to search for standing pins, means operable to cause said pickup means to reverse and move to an intermediate position above the alley bed, and in the event no pins are standing to cause said pickup means to travel to an upper position beyond said intermediate position, means operated by said pickup means to cause said sweep to clear the alley bed and return, means operated by said sweep near the end of its return movement to apply power from said drive means to cause said setting means to set pins on said alley bed, and means operated by said setting means to apply power from said drive means to cause said setting means and sweep to move to positions above the alley bed.

7. A machine as claimed in claim 6, wherein the means operable to cause the pickup means to reverse comprises a circuit including in series a switch operated by the pickup means and a plurality of normally closed switches carried by the pickup means and adapted to be operated by standing pins.

8. In a pinsetting machine having means for setting pins, means for picking up standing pins, means for sweeping pins from the alley bed into the pit and drive means for the setting, pickup and sweep means, in combination, control means comprising a switch in the pit operable in response to the rolling of a ball to apply power from said drive means to move said sweep from a position above the alley bed to an operative position adjacent the alley bed, a switch operated by said sweep at the end of said movement to apply power from said drive means to cause said pickup means to move downward to search for standing pins, means operable to cause said pickup means to reverse and move to an intermediate position above the alley bed and to an upper position beyond said intermediate position in the event no pins are standing, said last mentioned means comprising a circuit including in series a switch operated by the pickup means and a plurality of normally closed switches carried by said pickup means and adapted to be opened by standing pins, a switch operated by said pickup means to cause said sweep to clear the alley bed and return, means operated by said sweep near the end of its return movement to apply power from said drive means to cause said setting means to set pins on said alley bed, and means operated by said setting means to apply power from said drive means to cause said setting means and sweep to move to positions above the alley bed.

9. In a pinsetting machine having means for setting pins, means for picking up standing pins, means for sweeping pins from the alley bed into the pit and drive means for said setting, pickup and sweep means, in combination, control means comprising a source of control voltage, a first circuit including a first control member normally connected to said source for directing said machine through a normal two-ball cycle, a second circuit including a second control member for directing said machine through a one-ball strike cycle, a switch in the pit operable in response to the rolling of a ball to energize said first control member to apply power from said drive means to move said sweep from a position above the alley bed to an operative position adjacent the alley bed, a switch operated by said sweep at the end of said movement to apply power from said drive means to cause said pickup means to move downward to search for standing pins, a third circuit including in series a normally open switch closed by said pickup means at the bottom of its travel, a plurality of normally closed pin actuated switches for disabling said third circuit in the event pins are standing after the rolling of said ball and a relay for disconnecting said first circuit from said source and connecting said second circuit to said source, means for causing said pickup means to reverse and move to a position above the alley bed, a switch operated by said pickup means to cause said sweep to clear the alley bed and return, means operated by said sweep near the end of its return movement to apply power from said drive means to cause said setting means to set pins on said alley bed, and means operated by said setting means to apply power from said drive means to cause said setting means and sweep to move to positions above the alley bed.

10. In a pinsetting machine having means for picking up standing pins, means for sweeping pins from the alley bed into the pit and drive means for said sweep and pickup means, in combination, control means comprising means operable in response to the rolling of a ball to apply power from said drive means to move said sweep from a rest position above the alley bed to an operative position adjacent the alley bed, means operable in response to said movement to apply power from said drive means to cause said pickup means to move downward to search for standing pins, means for reversing the pickup means after a pickup operation, at least one switch actuated by contact of said pickup means with an off-normal pin for causing the pickup means to immediately reverse and move to an upper position in the event a pin is standing so far off its normal spot that it cannot be handled by said pickup means, and a switch operated by said pickup means for causing said sweep to move to a rest position above the alley bed.

11. In a pinsetting machine, in combination, a source of control voltage, first control means normally connected to said source for directing said machine through a one or two-ball cycle of operation, second control means for causing said machine to remove pins from the alley bed, return a plurality of rolled balls in succession as said balls are rolled and reset pins on the alley bed, and means for disconnecting said first control means from said source and for connecting said second control means to said source.

12. In a pinsetting machine having means for setting pins, means for picking up standing pins, means for sweeping pins from the alley bed into the pit, and drive means for the setting, pickup, and sweep means: an electromagnetic step-by-step switch controlling the operating sequence of said machine; and a plurality of electrical circuits closed by the mechanical movement of the various operating members of said machine, each of said circuits being operatively connected with the stepping magnet of said step-by-step switch for stepping said switch and advancing the operating sequence.

13. In a pinsetting machine having pin changing means for substituting one complement of pins for another, in combination, a source of control voltage for said pinsetting machine, a solenoid for causing said pin changing means to commence operation, a circuit including a manually operable normally open switch for connecting said control voltage to said solenoid, a magnetically operated relay having a contact in said circuit, said relay, when energized, causing the contact to condition said circuit for closing by said normally open switch, a stepping switch for controlling the cycle of operation of the pinsetting machine and responsive to the operation of said pinsetting machine for deenergizing said relay to cause the contact to open said circuit during a cycle of operation of said machine, and a switch responsive to the operation of said pin changing means for opening said circuit during a cycle of operation of said pin changing means.

14. In a pinsetting machine having means for picking up standing pins, means for sweeping pins from the alley bed into the pit and drive means for said sweep and pickup means, in combination, control means comprising a source of control voltage, plural electromagnetic means for controlling the operation of said drive means, separate circuits connecting said source of control voltage to said electromagnetic means, means operable in response to the rolling of a ball to close one of said circuits and energize the first of said electromagnetic means to apply power from said drive means to move said sweep from an out of the way position to an operative position adjacent the alley bed, and means operable in response to the movement of said sweep to close the other of said circuits and energize the second of said electromagnetic means to apply power from said drive means to cause said pickup means to search for and pick up standing pins.

15. In a pinsetting machine having means for picking up standing pins, means for sweeping pins from the alley bed into the pit and drive means for said sweep and pickup means, in combination, control means comprising a source of control voltage, first electromagnetic means for controlling the operation of said sweep, second electromagnetic means for controlling the operation of said pickup means, circuits connecting said source of control voltage to said electromagnetic means, a switch in the pit operable in response to the rolling of a ball to close the first of said circuits and energize said first electromagnetic means to apply power from said drive means to move said sweep from a position above the alley bed to a position adjacent the alley bed, a switch operated by said sweep near the end of said movement to close the second of said circuits and energize said second electromagnetic means to apply power from said drive means to cause said pickup means to search for and pick up standing pins, and switch means for controlling said source of control voltage.

16. In a pinsetting machine having means for picking up standing pins, means for sweeping pins from the alley bed into the pit and drive means for said sweep and pickup means, in combination, control means comprising a source of control voltage, a first circuit including a first control member normally connected to said source for directing said machine through a normal two-ball cycle, a second circuit including a second control member for directing said machine through a one-ball strike cycle, a third circuit including a third control member for stopping the operation of said machine in the event a pin is standing so far off its normal spot that it cannot be handled by said pickup means, a fourth circuit including a switch operated by said pickup means and a first relay for disconnecting said first circuit from said source and connecting said second circuit to said source, a second relay for disconnecting said first circuit from said source and connecting said third circuit to said source, means for selectively operating said second relay when a pin is standing so far off its normal spot that it cannot be handled, and a plurality of normally closed pin actuated switches connected in series in said fourth circuit for disabling said fourth circuit in the event any of said pin actuated switches are opened by one or more standing pins within the pickup range of the pickup means after the rolling of a first ball.

17. In a pinsetting machine having means for picking up standing pins, means for sweeping the pins from the alley bed into the pit and drive means for said sweep and pickup means, in combination, control means comprising a source of control voltage, a first electromagnetic means for controlling the effective operation of said sweep by said drive means, means in the pit operable in response to the rolling of a ball to energize said first electromagnetic means to apply power from said drive means to move said sweep from a position above the alley bed to a position adjacent the alley bed, a second electromagnetic means for controlling the effective operation of said pickup means by said drive means, means operable in response to said movement to energize said second electromagnetic means to apply power from said drive means to cause said pickup means to make a first move downward to search for standing pins, switch means operated by said pickup means at the end of said first downward movement to cause said pickup means to reverse and move to a position above the alley bed, means including a switch operated by said pickup means at a point above the alley bed to energize said first electromagnetic means to cause said sweep to clear the alley bed and return, switch means operated by said sweep near the end of its return movement to energize said second electromagnetic means to cause said pickup means to move a second time downward to reset pins on the alley bed, and means including a switch operated by said pickup means at the end of its second downward movement to cause said pickup means and sweep to return to positions above the alley bed, the timing of the movement of said pickup means and sweep being such that the pickup means reaches the top of its travel before the sweep.

18. In a pinsetting machine, in combination, a source of control voltage, first control means normally connected to said source for directing said machine through a one or two-ball cycle of operation, second control means for causing said machine to return a predetermined number of rolled balls in succession as said balls are rolled while omitting the one or two-ball cycle of operation, said number being in excess of two, and means for disconnecting said first control means from said source and for connecting said second control means to said source.

19. In a pinsetting machine, in combination, a source of control voltage, first control means normally connected to said source for directing said machine through a one or two-ball cycle of operation, second control means for causing said machine to return a predetermined number of rolled balls in succession as the balls are rolled while omitting the one or two-ball cycle of operation, said number being in excess of two, means for disconnecting said first control means from said source and for connecting said second control means to said source, and means for disabling said disconnecting means during a cycle of operation of said first control means.

20. In a pinsetting machine, in combination, a source of control voltage, first control means normally connected to said source for directing said machine through a one or two-ball cycle of operation in the course of a game of bowling, second control means for causing said machine to remove pins from the alley bed, return a plurality of rolled balls in succession and reset pins on the alley bed after the return of the plurality of balls, manually operable means for disconnecting said first control means from said source and for connecting said second control means to said source, and a relay operable in response to said first control means for disabling said disconnecting means during a cycle of operation of said first control means.

21. In a pinsetting machine having a guard for protecting the machine from inadvertently rolled balls, in combination, a power source, means operable upon the rolling of a ball to connect said guard to the power source and cause said guard to move from an out of the way position to an operative position, means for elevating said ball to a return track, a circuit including a solenoid for connecting said guard to the power source for raising the guard, and a ball operated switch, positioned for operation by a ball as it is elevated, in said circuit for completing the circuit and causing said guard to return to an inoperative position.

References Cited in the file of this patent

UNITED STATES PATENTS

| | | | |
|---|---|---|---|
| 1,896,383 | White | Feb. 7, | 1933 |
| 2,017,143 | Bentz | Oct. 15, | 1935 |
| 2,250,503 | Rundell | July 29, | 1941 |
| 2,310,218 | Davis | Feb. 9, | 1943 |
| 2,319,925 | Flanagan | May 25, | 1943 |
| 2,341,475 | Parra et al. | Feb. 8, | 1944 |
| 2,383,017 | Rundell | Aug. 21, | 1945 |
| 2,388,708 | Bates | Nov. 13, | 1945 |
| 2,514,457 | Schmidt | July 11, | 1950 |
| 2,620,187 | Whipple et al. | Dec. 2, | 1952 |
| 2,621,045 | Montooth | Dec. 9, | 1952 |